(12) United States Patent
Machida

(10) Patent No.: US 7,463,289 B2
(45) Date of Patent: Dec. 9, 2008

(54) DIGITAL CAMERA PRODUCING IMAGE EMBEDDED WITH DIAGNOSTIC CHARACTERISTIC

(75) Inventor: Akihiro Machida, Sunnyvale, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 827 days.

(21) Appl. No.: 10/841,854

(22) Filed: May 7, 2004

(65) Prior Publication Data

US 2005/0248668 A1    Nov. 10, 2005

(51) Int. Cl.
H04N 5/76 (2006.01)
H04N 5/262 (2006.01)
G06K 15/00 (2006.01)
G06K 9/00 (2006.01)

(52) U.S. Cl. .......... 348/231.1; 348/231.6; 348/239; 358/3.28; 382/100

(58) Field of Classification Search .......... 348/231.3, 348/231.6, 239; 358/3.28; 382/100
See application file for complete search history.

(56) References Cited

U.S. PATENT DOCUMENTS

| | | | |
|---|---|---|---|
| 6,366,680 B1 * | 4/2002 | Brunk et al. | 382/100 |
| 6,400,827 B1 | 6/2002 | Rhoads | |
| 6,504,941 B2 | 1/2003 | Wong | |
| 6,535,618 B1 | 3/2003 | Rhoads | |
| 6,542,620 B1 | 4/2003 | Rhoads | |
| 6,577,336 B2 | 6/2003 | Safai | |
| 6,642,956 B1 | 11/2003 | Safai | |
| 6,963,363 B1 * | 11/2005 | Ohmura | 348/231.3 |
| 7,031,493 B2 * | 4/2006 | Fletcher et al. | 382/100 |
| 7,251,343 B2 * | 7/2007 | Dorrell et al. | 382/100 |
| 7,327,390 B2 * | 2/2008 | Gallagher | 348/224.1 |
| 2002/0001395 A1 * | 1/2002 | Davis et al. | 382/100 |
| 2002/0015510 A1 * | 2/2002 | Akashi | 382/100 |
| 2003/0169905 A1 * | 9/2003 | Butterworth | 382/115 |
| 2003/0235326 A1 | 12/2003 | Morikawa et al. | |
| 2004/0257625 A1 * | 12/2004 | Tonami | 358/3.28 |

FOREIGN PATENT DOCUMENTS

| | | | |
|---|---|---|---|
| JP | 2000196937 A * | 7/2000 | |
| JP | 2001144937 A * | 5/2001 | |

* cited by examiner

*Primary Examiner*—David Ometz
*Assistant Examiner*—Wanda M Negron
(74) *Attorney, Agent, or Firm*—RatnerPrestia

(57) ABSTRACT

A digital camera including a user input device for adjusting at least one visual error diagnostic characteristic, an image processor configured to create a digital image, a watermark engine configured to organize watermark data, and an image buffer configured to embed the watermark data within the digital image. The at least one visual error diagnostic characteristic has at least two settings. The watermark data includes a current setting of the at least one visual error diagnostic characteristic.

20 Claims, 8 Drawing Sheets

DIGITAL CAMERA PRODUCING IMAGE EMBEDDED WITH DIAGNOSTIC CHARACTERISTIC

BACKGROUND

Digital image technology is being used in an increasing variety of mass-produced applications and manufactured at increasing production volumes. The increased production volumes are due not only to the increasing popularity of conventional digital cameras, but also due to miniature fixed-focused digital camera modules being incorporated into various end products such as portable telephones (cellular telephones) and personal digital assistants (PDA's). Given the new high volume applications for digital camera modules, it has become increasing important for digital camera module fabricators to identify a particular module to ease future servicing of the digital camera modules.

In typical fabrication methods, each digital camera module is stamped with a date code signifying the week in which the imaging module was manufactured. For example, all digital camera modules manufactured in the week of Jun. 1, 2003 through Jun. 7, 2003 are stamped with the same date code, such as "060103."

Since the manufacturing volume of digital camera modules typically surpasses 100,000 a week, the date codes do not provide for a high degree of precision in tracking an individual digital camera module. Rather, the date code merely serves to place the digital camera module within a pool of over 100,000 other digital camera modules. Due to the imprecise tracking of digital camera modules, upon subsequent malfunction or problem with a specific digital camera module, it becomes increasingly difficult to track the problems with the digital camera module to a particular part, manufacturing technique, or other variance in the individual module with respect to other digital camera modules manufactured in the same week. Moreover, as digital camera modules become increasingly complicated products, more manufacturing variances from digital camera module to digital camera module will occur even among digital camera modules manufactured in the same week (i.e., with the same date code).

Users of the digital camera modules may also experience problems in producing digital images such as discoloration, poor resolution, etc. In particular, a digital image produced by the digital camera module may be slightly blurry, have a pink hue, and/or have a blue hue on a specific portion, region, or on the entirety of the image. Although such problems may be the result of a physical or manufacturing problem with the digital camera module, often times these image problems are caused by the user adjustable image setting(s) of the digital camera module, such as the color filter variation, the gain, the anti-blooming option, the offset, etc.

Upon receipt of a distorted or discolored image, it is often difficult for a user to trace the distortions in an image to the particular settings of the digital camera module used at the time the digital image was taken. It is even more difficult to determine which setting(s) need to be adjusted to remedy the distortion and/or discoloration. Conventionally, these difficulties are not easily overcome by a digital camera service representative or support center as they often do not know what the digital camera module settings were when the digital image was captured, nor do they know manufacturing specifics regarding a particular digital camera module.

SUMMARY

One form of the present invention relates to a digital camera including a user input device for adjusting at least one visual error diagnostic characteristic, an image processor configured to create a digital image, a watermark engine configured to organize watermark data, and an image buffer configured to embed the watermark data within the digital image. The at least one visual error diagnostic characteristic has at least two settings. The watermark data includes a current setting of the at least one visual error diagnostic characteristic.

BRIEF DESCRIPTION OF THE DRAWINGS

Embodiments of the invention are better understood with reference to the following drawings. Elements of the drawings are not necessarily to scale relative to each other. Like reference numerals designate corresponding similar parts.

DETAILED DESCRIPTION

In the following detailed description, references made to the accompanying drawings, which form a part hereof, and which is illustrated by way of illustrations specific embodiments in which the invention may be practiced. In this regard, directional terminology, such as "front,""back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
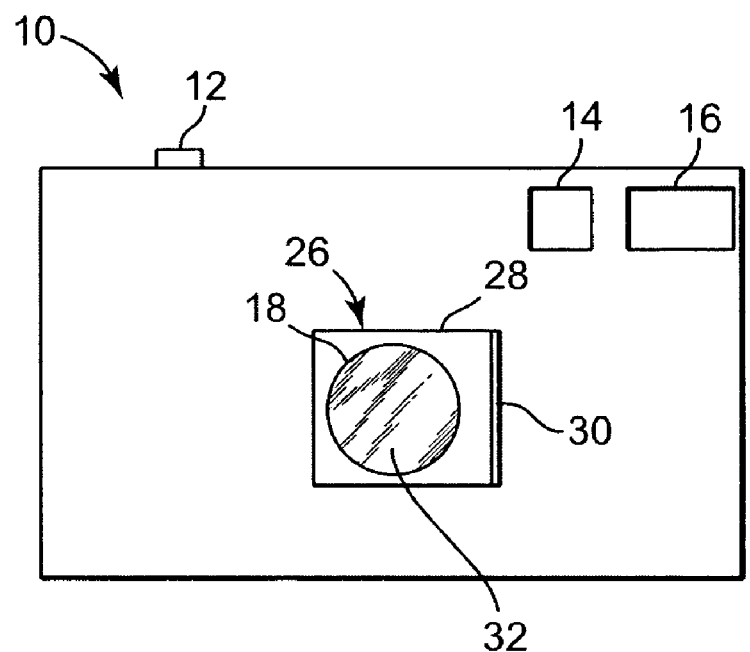
FIG. 1 is a diagram illustrating a simplified front view of a digital camera.
Figure 2:
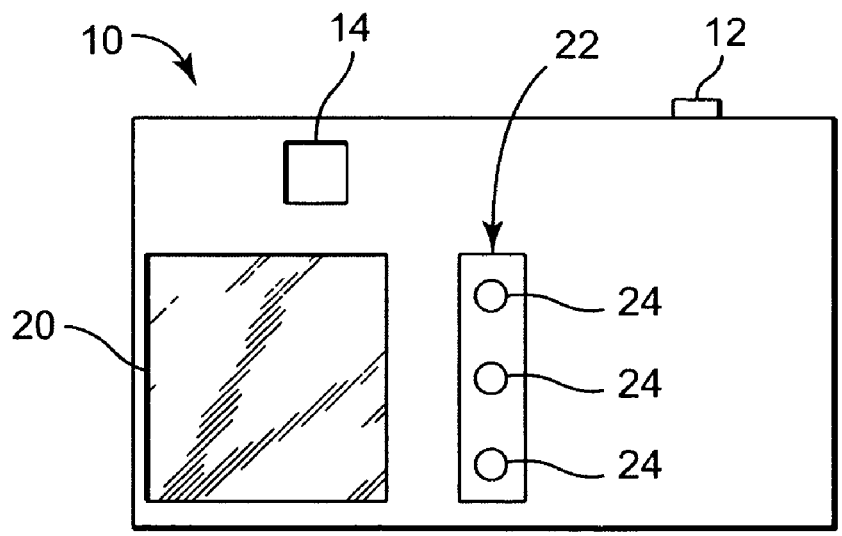
FIG. 2 is a diagram illustrating a simplified rear view of the digital camera illustrated in FIG. 1.

FIG. 1 is a diagram illustrating a simplified front view of a digital camera 10, and FIG. 2 is a diagram illustrating a simplified rear view of digital camera 10. Digital camera 10 is any electronic device incorporating a digital camera module. As illustrated in FIGS. 1 and 2, digital camera 10 includes a shutter button 12, an optical view finder 14, a flash 16, a primary lens 18, a liquid crystal display (LCD) 20, and an user input device 22. In operation, a user looks through optical view finder 14 or at LCD 20 and positions digital camera 10 to capture a desired image. When digital camera 10 is in position, the user presses shutter button 12 to capture the desired image.

An optical image is focused by primary lens 18 onto an image sensor (not illustrated), which generates pixel data that is representative of the optical image. Captured images are displayed on LCD 20. User input device 114 includes a plurality of buttons 24. User input device 22 allows a user (not illustrated) to enter data and select various camera image options or attributes that affect the viewable characteristics of the captured image. With this in mind, each such camera attribute has at least two settings. Flash 16 is used to illuminate an area to capture images in low-light conditions.

In one embodiment, digital camera 10 optionally includes a fingerprint attachment 26. Fingerprint attachment 26 includes a lens assembly 28 and a hinge 30. Fingerprint attachment 26 is mounted to the front face of digital camera 10 via hinge 30. Lens assembly 28 is configured to rotate about hinge 30, so that lens assembly 28 may be positioned over primary lens 18 as illustrated in FIG. 1 for capturing fingerprint images, or rotated away from primary lens 18 for general-purpose photography. In particular, fingerprint images are captured by placing a finger upon an outer, transparent, planar surface 32 of lens assembly 28 and pressing shutter button 12 to capture a digital image of the fingerprint rather than of the desired image as described above.

When using digital camera 10, the user (not illustrated) uses buttons 24 of user input device 22 to modify the captured image and, thereby, to modify that displayed on LCD screen 220. In particular, in one embodiment, buttons 24 are used to manipulate camera image attribute settings by viewing LCD 20. In one embodiment, the camera image attributes include gain, color level, shutter speed, offset, gamma level, sharpness, anti-blooming status, focus distance, zoom lens displacement position, hyper focal lens position, etc. By adjusting the settings of one or more of these camera image attributes, a user alters the digital image to be captured by digital camera 10.

Figure 3:
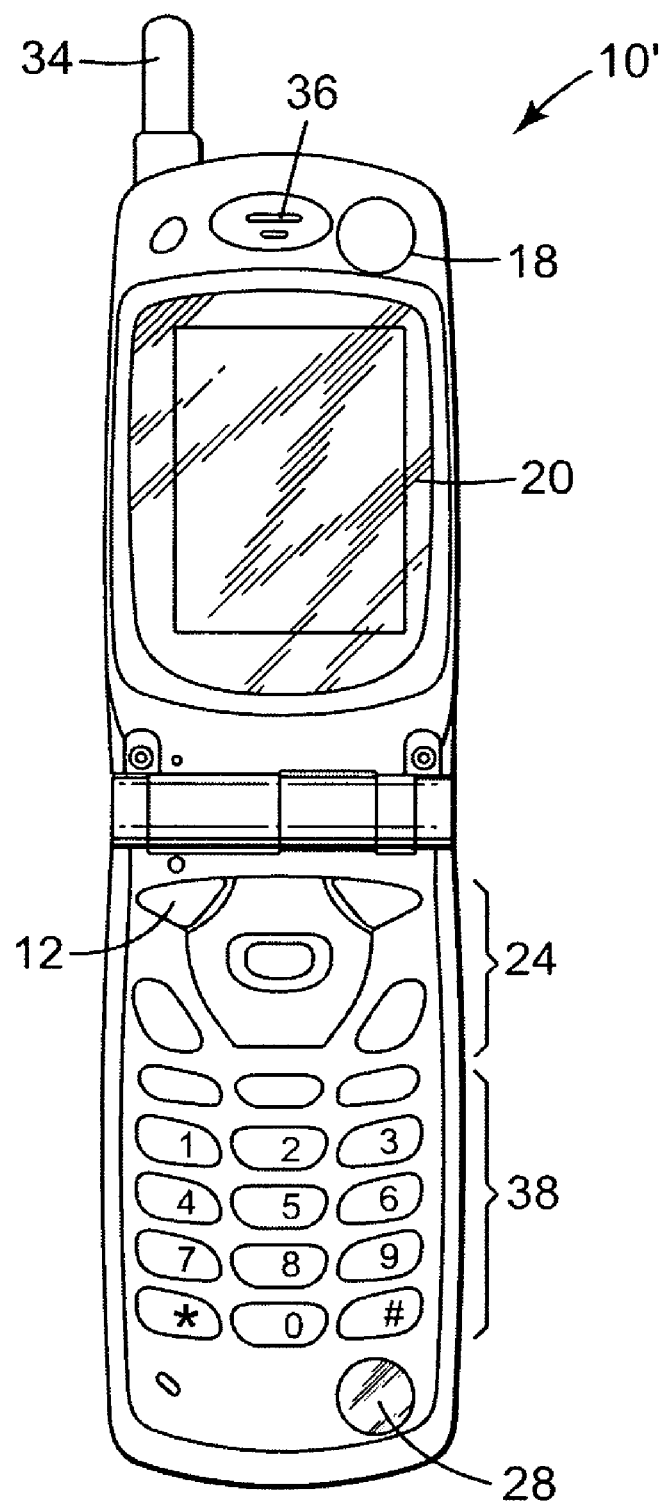
FIG. 3 is a block diagram illustrating a cellular telephone incorporating a camera.

Although digital camera 10 is referred to through the remaining Detailed Description, it should be noted that an alternative digital camera 10' functions and can be used in a similar manner as described herein with respect to digital camera 10. As illustrated in FIG. 3, digital camera 10' is an electronic device, particularly a cellular telephone, incorporating a digital camera module. In an alternative embodiment, digital camera 10' is a PDA, computer, or other electronic device incorporating a digital camera module. As such, digital camera 10' includes shutter button 12, primary lens 18, LCD 20, user input buttons 24, and optional fingerprint lens assembly 28 similar to digital camera 10. In addition, digital camera 10' includes an antenna 34, a speaker 36, additional input buttons 38, etc.

Figure 4:
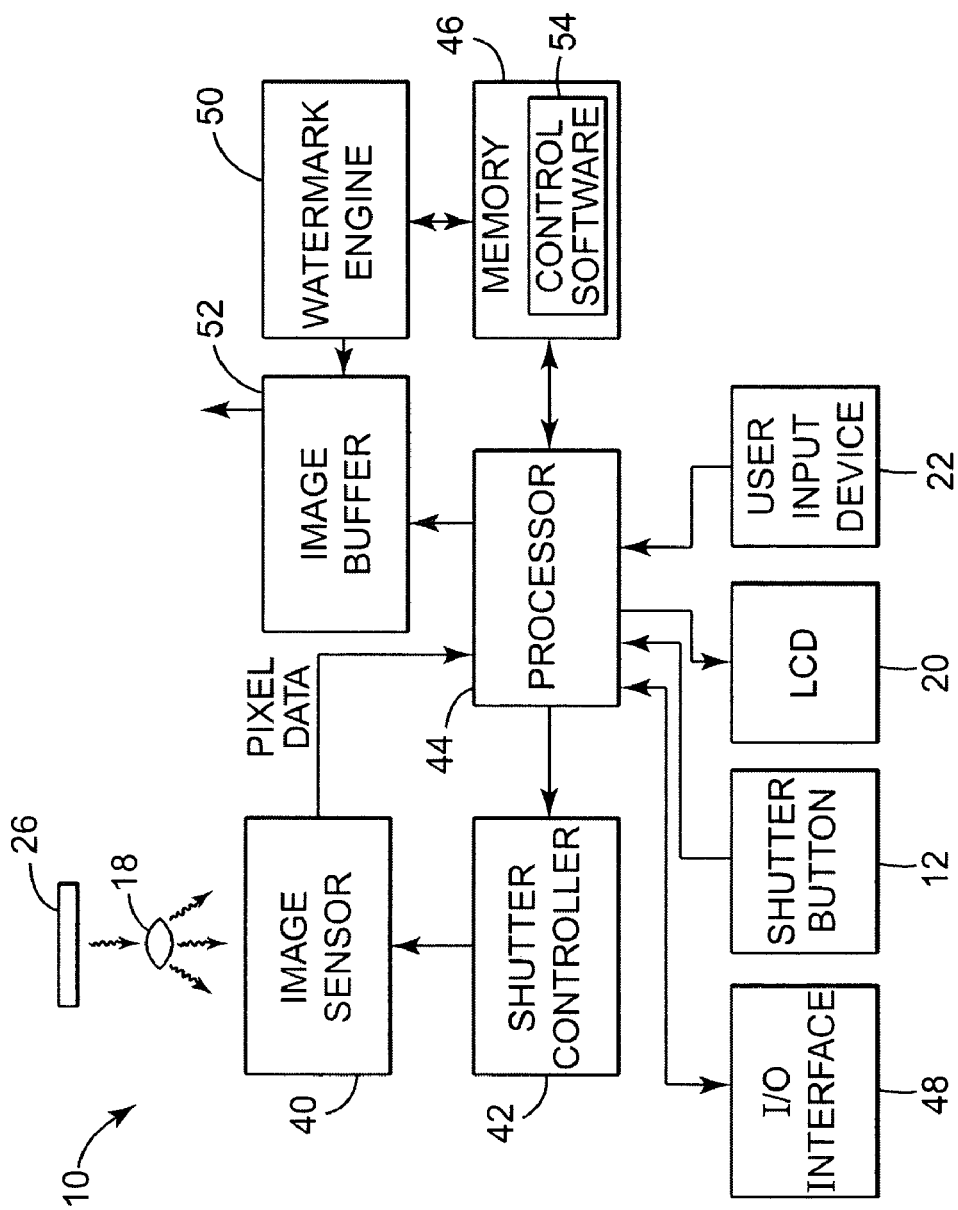
FIG. 4 is a block diagram illustrating major components of the digital camera illustrated in FIGS. 1 and 2.

FIG. 4 is a block diagram illustrating the major components of digital camera 10 and the interaction between the major components. Digital camera 10 includes optional fingerprint attachment 26, primary lens 18, an image sensor 40, a shutter controller 42, a processor 44, a memory 46, an input/output (I/O) interface 48, shutter button 12, LCD 20, user input device 22, a watermark engine 50, and an image buffer 52.

In operation, when a user (not illustrated) presses shutter button 12, processor 44 and shutter controller 42 cause image sensor 40 to capture an image, more particularly, to capture the light bouncing off of the subject (not illustrated). Image sensor 40 converts the light captured into pixel data and outputs the pixel data representative of the image to processor 44. In one embodiment, image sensor 40 is a charge coupled device (CCD) or a complementary metal oxide semiconductor (CMOS). The pixel data is stored in memory 46, and captured images may be displayed on LCD 20.

Memory 46 stores camera identification information, such as a manufacturer name, an ID or serial number for the particular digital camera and/or digital camera module, etc. In one embodiment, the serial number is a date code. In another embodiment, the serial number is unique to the particular digital camera module. In one embodiment, memory 46 further stores visual error diagnostic characteristics, such as information regarding the camera image attributes of digital camera 10 set by user as described above, etc, which can be analyzed to determine the cause of visual error in images produced by digital camera 10.

In one embodiment, memory 46 includes a type of random access memory (RAM) and non-volatile memory, but can include any known type of memory storage. In one embodiment, memory 46 includes a type of programmable read-only memory (PROM) such as electrically erasable programmable read-only memory (EEPROM).

Memory 46 further includes control software 54 for controlling processor 44. In one embodiment, control software 54 includes software for analyzing captured fingerprint images to verify the user of digital camera 10. Control software 54 includes software for driving the creation or collection and embedding of watermark data as will further be described below.

I/O interface 48 is configured to be coupled to a computer or other appropriate electronic device (e.g., a personal digital assistant (PDA), etc.), for transferring information between the electronic device and digital camera 10, including downloading captured images from digital camera 10 to the electronic device.

Figure 5:
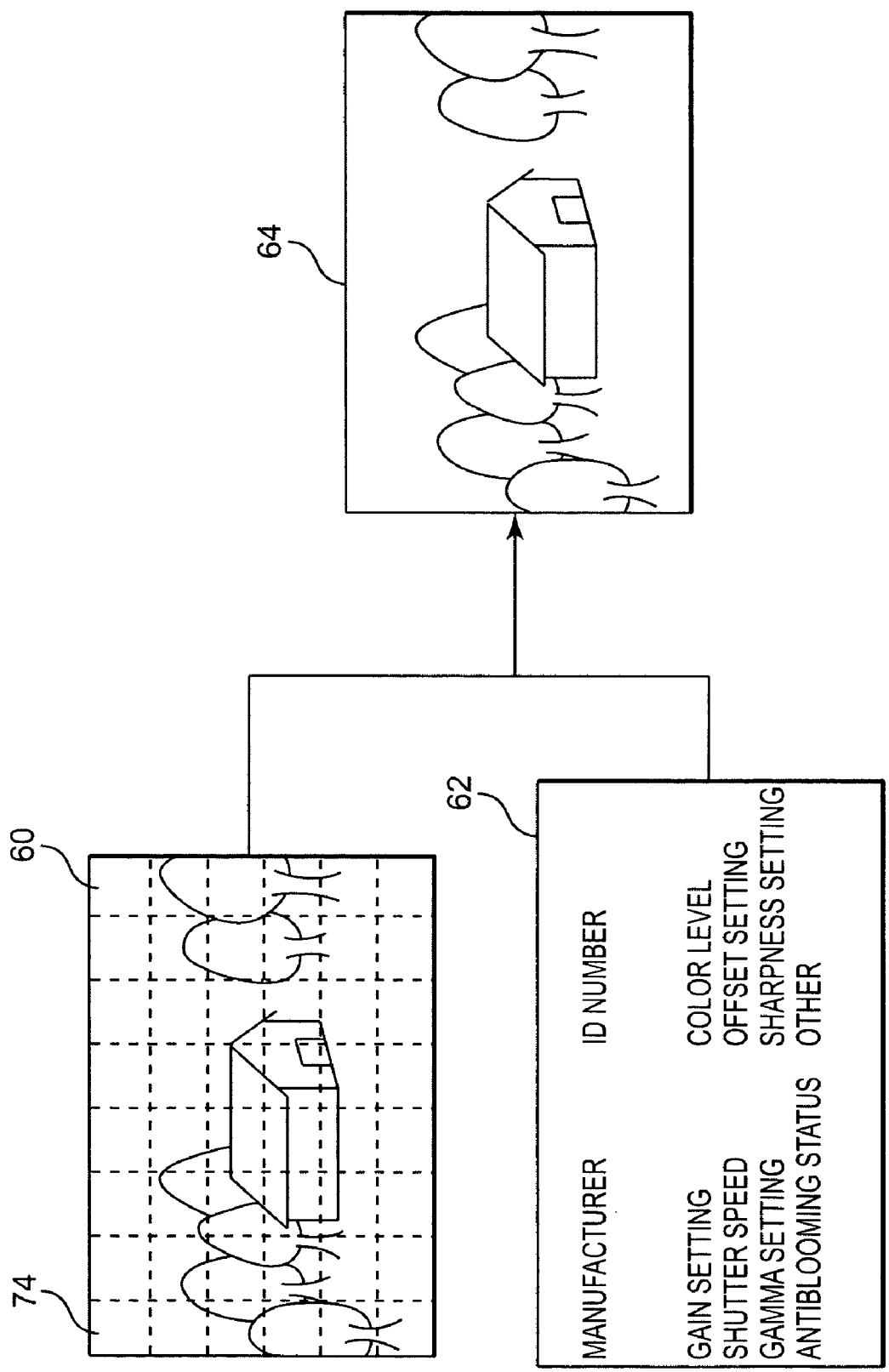
FIG. 5 is a diagram illustrating an original image and watermark data combining to form a watermarked image.

Processor 44 develops an original digital image 60 (i.e., a non-watermarked image). Watermark engine 50 accesses memory 46 to obtain at least a portion of the camera identification information and/or at least one of the visual error diagnostic characteristics. Watermark engine 50 uses the information obtained from memory 46 to form watermark data 62 as generally illustrated with additional reference to FIG. 5. In one embodiment, watermark data 62 includes at least one visual error diagnostic characteristic, such as a user definable camera image attributes. In one embodiment, watermark data additionally or alternatively includes at least one of a manufacturer identification, a serial number, and a date of image capture.

Image buffer 52 obtains original digital image 60 from processor 44 and watermark data 62 from watermark engine 50. Image buffer 52 integrates or embeds original digital image 60 with watermark data 62 to produce a watermarked image 64 in which original digital image 60 is embedded with watermark data 62 by superposition in a manner rendering watermark data 62 invisible to the human eye within the newly produced watermarked image 64.

Figure 6:
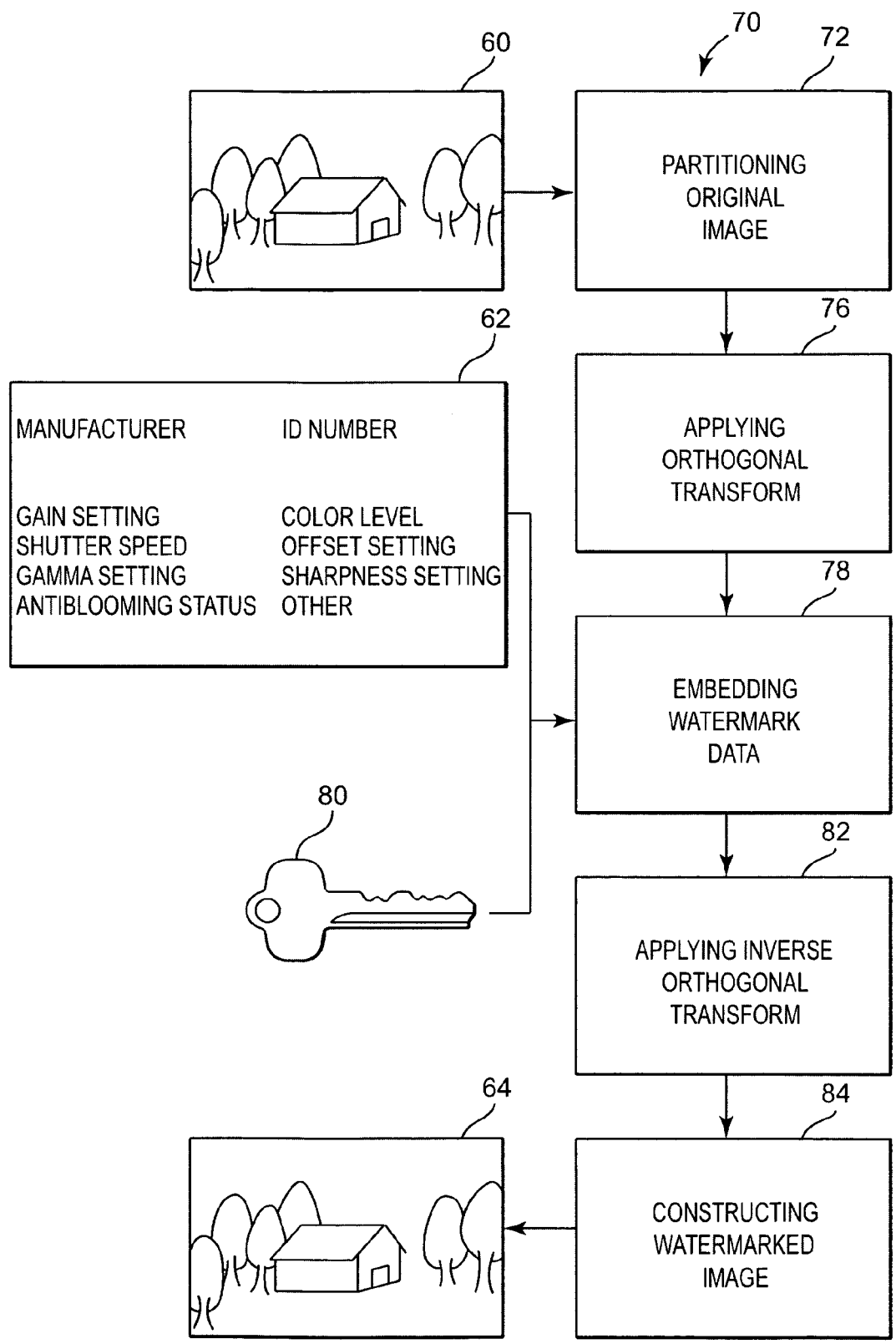
FIG. 6 is a flow chart illustrating an exemplary embodiment of a digital camera process of embedding watermark data to form a watermarked image.

An exemplary watermark data embedding process 70 is more specifically illustrated with reference to the flow chart of FIG. 6. At 72, the original digital image 60 is divided or partitioned into a plurality of blocks 74 (illustrated in FIG. 4). Each block 74 is composed of n×m pixels. At 76, an orthogonal transform is applied to the partitioned image to obtain an n×m matrix of frequency components. In one embodiment, the orthogonal transform is a transform such as a discreet cosine transform (DCT). The frequency component matrix, the watermark data 62, and key information 80 are used to embed watermark data 62 into digital image 60 at 78.

In particular, before actually embedding watermark data 62 into digital image 60, an embed component indicating in which component of the frequency component matrix is to be embedded is determined based upon a random number. An amount of alteration, which indicates the extent to which the value of this frequency component will be altered, is also decided. Both the embed component and the amount of alteration are stored in memory 46 (illustrated in FIG. 4) as key information 80. In one embodiment, key information 80, more particularly, the embed component, is selected to be a low frequency portion of the frequency component matrix such that watermark data 62 is embedded with digital image 60 in a manner invisible to the human eye (not illustrated). Changes to the amount of alteration control the differences relative to original digital image 60, and, as such, can be changed to control the decline in image quality of watermarked image 64.

With this in mind, at 78, the value of the frequency component matrix of each selected block 74 is changed based upon key information 80, thereby, embedding watermark data 62 within the orthogonally transformed representation of digital image 60. Notably, depending upon the information contained in watermark data 62, image 60 captured by digital camera 10 may vary with the plurality of digital images 60 captured. For example, if watermark data 62 only includes a manufacturer and/or a camera serial number, watermark data 62 remains the same for every digital image 60 captured by digital camera 10. Conversely, if watermark data 62 includes visual error diagnostic characteristics, such as camera image attribute(s), then watermark data 62 may vary with the plurality of digital images 60 captured by digital camera 10 as the visual error diagnostic characteristic(s) vary.

At 82, an inverse orthogonal transform is applied to the frequency component matrices of each respective block 74 in which watermark data 62 is embedded at 78. At 84, the images of the plurality of blocks 74 obtained by inverse orthogonal transform at 82 are connected to each other to construct a watermark image 64 in which watermark data 62 is embedded into original digital image 60. In a preferred embodiment, watermark image 64 is indistinguishable to the human eye from original digital image 60. The watermark data 62 stored within watermark image 64 is obtained by undergoing an extraction process.

Figure 7:
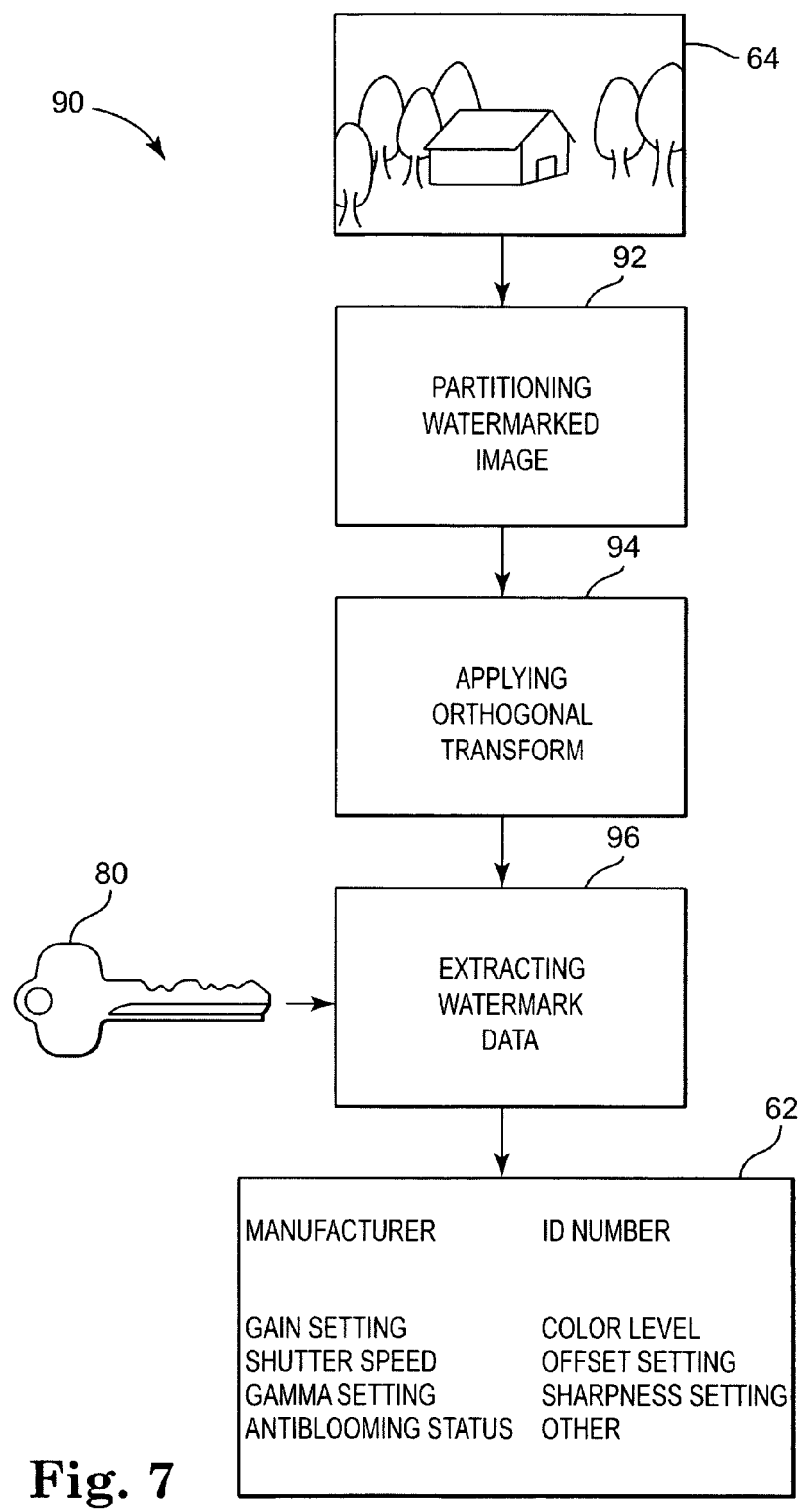
FIG. 7 is a flow chart illustrating an exemplary embodiment of a process of extracting watermark data from the watermarked image formed via the process illustrated in FIG. 5.

FIG. 7 illustrates one exemplary embodiment of an extraction process 90. At 92, watermark image 64 is broken into a plurality of blocks each consisting of n×m pixels in a similar manner as described above with respect to digital image 60 at step 72 of embedding process 70. At 94, an orthogonal transform such as the discreet cosine transformation (DCT) is applied to each divided block to obtain an n×m frequency component matrix for each block. At 96, an embedding position and an alteration amount are obtained from key information 74 and used to extract watermark data 62 from the frequency component matrices of the respective blocks. Notably, key information 80 includes the same embedding position and alteration amount that were used in the embedding process 70.

It should be noted that using the above described embedding process 70 and extraction process 90, embedded watermark data 62 cannot be extracted from watermark image 64 without key information 80 that was used during the embedding process 70. Further, in one embodiment, key information 80 is generated using random numbers and, therefore, is variable and difficult to decode by an unauthorized user. In addition, key information 80, in particular, the alteration amount, controls the degree of deterioration in image quality occurring in transforming original digital image 60 to watermark image 64. Moreover, although described above as embedding watermark data 62 into watermark image 64 in a manner unperceivable by the human eye, watermark data 62 could alternatively be embedded into watermark image 64 in a manner perceivable by the human eye by altering key information 74. Other variations and alternatives to the embedding and extraction processes 70 and 90 described herein will be apparent to those of skill in the art.

Figure 8:
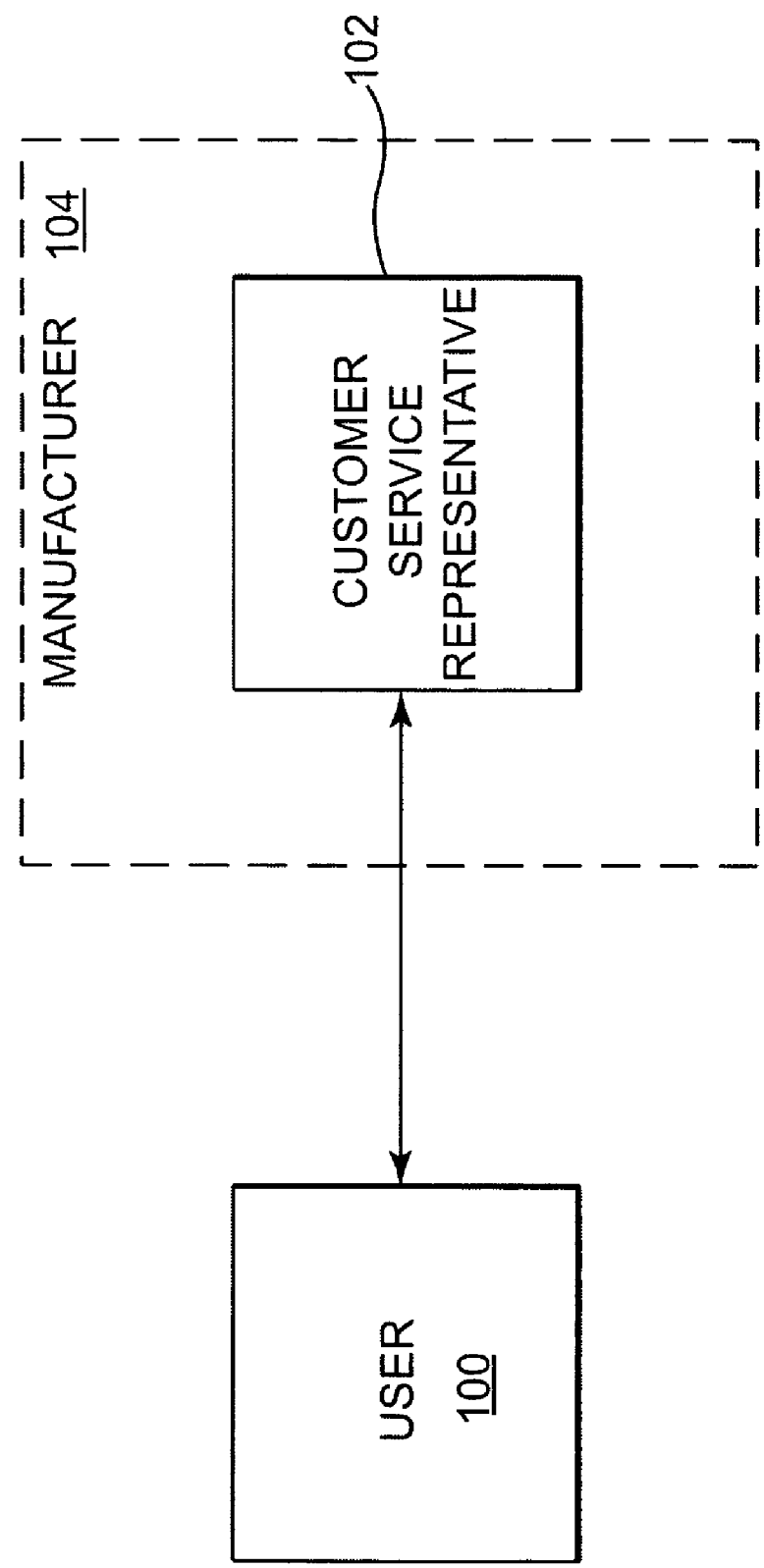
FIG. 8 is a diagram illustrating interaction between a user of the digital camera illustrated in FIG. 1 and a customer service representative.

In one embodiment, illustrated in FIG. 8, a user 100 of digital camera 10 (illustrated in FIGS. 1 and 2) discovers a camera error, a distortion, or a discoloration in the image produced by digital camera 10. In many circumstances, user 100 is unable to ascertain the problem causing the error in digital camera 10 or the distortion or discoloration to watermark image 64 produced by digital camera 10. As such, in order to remedy digital camera 10 or adjust the camera settings of digital camera 10 to remedy the image distortion or discoloration, user 100 consults a customer service representative 102. In one embodiment, customer service representative 102 is a division or part of a manufacturer 104, which originally manufactured digital camera 10 used by user 100. In other embodiments, customer service representative 92 is not part of the original manufacturer 104 of digital camera 10.

Figure 9:
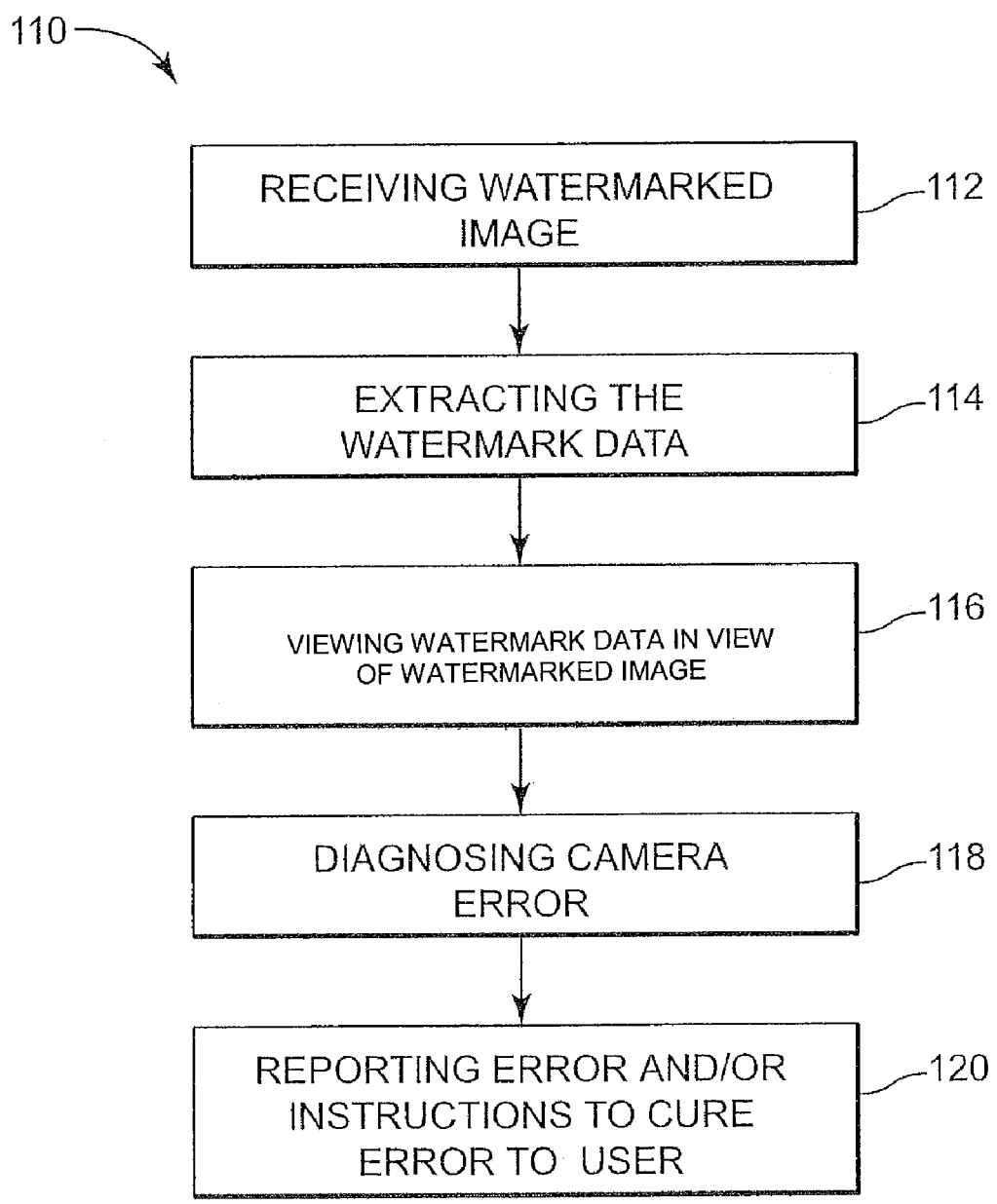
FIG. 9 is a flow chart illustrating an exemplary embodiment of a process of determining camera error using the watermarked image created in the process illustrated in FIG. 5.

More specifically, as illustrated with additional reference to the flow chart of FIG. 9, customer service representative 102 performs a diagnostic procedure 110 to identify the cause of the identified error. With this in mind, at 112, customer service representative 102 digitally receives watermark image 64 from user 100. In one embodiment, customer service representative 102 receives watermarked image 64 sent from user 100 via the internet (not illustrated). At 114, customer service representative 102 performs an extraction process, such as extraction process 90 (illustrated in FIG. 7), to obtain watermark data 62. Notably, customer service representative 102 has access to the necessary key information 74 to complete the extraction process 90 as described above.

At 116, customer service representative 102 views watermark data 62, which includes at least one visual error diagnostic characteristic, in view of watermark image 64, in particular, in view of the distortions, discolorations, etc. of watermark image 64. At 118, customer service representative 102 uses at least one visual error diagnostic characteristic included in watermark data 62 and the distortions and/or discolorations to diagnosis any physical camera and/or camera image attribute setting errors. In one embodiment, customer service representative 102 analyzes the manufacturer information in watermark data 62 to determine the manufacturer of digital camera 10. In addition, customer service representative 92 can obtain the serial or ID number from watermark data 62.

Use of the manufacturer and/or serial number allows customer service representative 102 to evaluate probable defects known to have occurred in the manufacturing line or in parts of digital camera 10 by comparing the serial number to the manufacturing processes used to produce digital camera 10 with the particular serial number, the parts used in manufacture of digital camera 10 with the particular serial number, and/or other logged information about digital cameras with similar manufacturing processes or parts, etc. Notably, in addition, customer service representative 102 may also log and analyze the serial numbers and manufacturer data against the problems reported with respect to various digital cameras 10 by various users to evaluate the quality and/or lack thereof of individual and/or overall manufacturing techniques, equipment, and parts used to produce digital cameras 10.

In one embodiment, customer service representative 102 additionally or alternatively uses the extracted watermark data 62 to evaluate visual error diagnostic characteristics of digital camera 10. In particular, by viewing watermarked image 64 to identify the distortion or discoloration in view of the at least one visual error diagnostic characteristic in watermark data 62, such as the settings of the camera image attributes, etc. of digital camera 10, customer service representative 102 is able to identify errors in the camera image attribute settings and suggest alternative settings of the camera image attributes that would rectify, or at least lessen, the image distortions. Otherwise stated, customer service representative 102 is able to determine which camera image attribute setting(s) require adjustment or other remedies to cure or lessen the distortion or discoloration of watermark image 64.

At 120, upon determining the camera error, customer service representative 102 reports the nature of the error and/or instructions to cure or lessen the error to user 100. In response to the report obtained from customer service representative 102 at 120, user 100 may decide to take digital camera 10 in for repair or choose to alter the user definable settings of digital camera 10 in order to rectify the camera distortion or discoloration or physical camera error. With this in mind, in many cases, merely sending watermarked image 64 to customer service representative 102 and receiving feedback via e-mail, telephone, postal mail, etc., user 100 can determine the degree of the problem and whether or not user 100 is able to rectify the physical problem with digital camera 10 or image distortion or discoloration with our without utilizing a camera repair service.

While described above as using customer service representative 102 to determine the camera error or setting error causing image distortion or discoloration, in one embodiment, user 100 is able to extract watermark data 62 from watermark image 64 to diagnose the camera error or setting error without use of customer service representative 102. In such an embodiment, user 100 may utilize software provided by a manufacturer 104 with a purchase of digital camera 10 including key information 80 and being capable of extracting watermark data 62 in a process similar to diagnostic procedure 110. In one embodiment, the software is run on an electronic device such as a computer or PDA and the image is sent to the electronic device via I/O interface 48. In one embodiment, the software also includes diagnosis software to assist user 100 in determining the physical camera or camera setting error and/or determining the proper action to remedy the physical camera or camera setting error.

Although specific embodiments have been illustrated and described herein for purposes of description of the preferred embodiment, it will be appreciated by those of ordinary skill in the art that a wide variety of alternate and/or equivalent implementations may be substituted for the specific embodiments illustrated and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A digital camera system including:
   a digital camera comprising:
      a user input device for adjusting a setting of at least one visual error diagnostic characteristic, wherein the at least one visual error diagnostic characteristic has at least two settings,
      an image processor configured to create a digital image,
      a watermark engine configured to organize watermark data, the watermark data including a current setting of the at least one visual error diagnostic characteristic, and
      an image buffer configured to embed the watermark data within the digital image, as a watermarked image, and for outputting the watermarked digital image; and
   a diagnostic device, remote from the digital camera, for receiving the outputted watermarked digital image, for determining the current setting of the at least one visual error diagnostic characteristic from the watermarked data and for identifying, based on user input, errors in an image setting of the digital camera based on the determined current setting of the at least one visual error diagnostic characteristic and visual errors in the digital image,
   wherein the diagnostic device, based on user input, compares the current setting of the at least one visual error diagnostic characteristic to the visual errors of the watermarked digital image, and determines at least one adjustment image setting to reduce or remedy the visual errors in subsequently captured digital images.

2. The digital camera of claim 1, wherein one of the at least one visual error diagnostic characteristic includes at least one of a group of camera image attribute settings including gain setting, color level, shutter speed, offset setting, gamma setting, sharpness setting, antiblooming status, focus distance, auto focus lens displacement position, zoom lens displacement position, or hyper focal lens position.

3. The digital camera of claim 1, wherein the at least one visual error diagnostic characteristic is user adjustable between at least a first setting and a second setting.

4. The digital camera of claim 1, wherein the image buffer is configured to embed the watermark data within the digital image rendering the watermark data invisible to a human eye.

5. The digital camera of claim 1, wherein the watermark data includes a serial number of the digital camera.

6. The digital camera of claim 5, wherein the serial number is unique to the particular digital camera.

7. The digital camera of claim 1, further comprising:
   a primary lens for focusing images; and
   a fingerprint attachment including a lens assembly and a hinge, the lens assembly configured to rotate about the hinge for positioning the lens assembly to be axially aligned with the primary lens to capture a digital image of a fingerprint.

8. The digital camera of claim 7, wherein the fingerprint attachment is rotated away from the primary lens to capture digital images other than the fingerprint image.

9. A method of servicing a digital camera, wherein the digital camera is configured to capture images and embed the captured images with watermark data to output a watermarked image, the method comprising:
   viewing the watermarked image to determine when the watermark image includes a visible error; and
   assessing the cause of the visible error including:
      extracting the watermark data from the watermark image to obtain the watermark data;

diagnosing errors in one or more image settings of the digital camera that at least partially causes the visible error by assessing the watermark data in consideration of the visible error in the watermarked image to adjust the image settings of the digital camera; and determining, by a diagnostic device based on user input, at least one adjustment image setting to reduce or remedy the visual error in subsequently captured digital images.

10. The method of claim 9, wherein the watermark data includes at least one visual error diagnostic characteristic.

11. The method of claim 9, wherein the visual error diagnostic characteristic includes a current setting of at least one user definable camera image attribute, and the at least one user definable camera image attribute has at least two settings.

12. The method of claim 9, further including prompting a digital camera user to change the setting of the at least one of user definable camera image attributes to at least partially remedy the visual error.

13. The method of claim 9, wherein assessing the cause of the visible error further includes uploading the watermarked image to the diagnostic device separate from the digital camera.

14. The method of claim 9, wherein the watermark data includes a manufacturer identification and a digital camera serial number.

15. The method of claim 14, wherein at least a partial cause of the visible error is a manufacturing defect.

16. A method of servicing a digital camera, wherein the digital camera is configured to capture images and embed the captured images with watermark data to output a watermarked image, the method comprising:

viewing the watermarked image to determine when the watermark image includes a visible error; and assessing the cause of the visible error including:

extracting the watermark data from the watermark image to obtain the watermark data;

diagnosing errors in one or more image setting of the digital camera that at least partially causes the visible error by assessing the watermark data in consideration of the visible error in the watermarked image to adjust the image setting of the digital camera; and digitally sending, by a digital camera user, the watermarked image to a customer service representative, wherein the customer service representative performs the steps of extracting the watermark data and comparing the watermark data and the visible error.

17. A method of recording digital camera characteristics using watermark data, the method comprising:

capturing an image using a digital camera;

embedding the watermark data within the digital image to create a watermarked image, the watermark data including visual setting indicators of the digital image;

extracting the watermark data from the watermarked image;

diagnosing errors in one or more image settings of the digital camera that at least partially causes a visible error by assessing the watermark data in consideration of the visible error in the watermarked image; and determining at least one adjustment image setting to reduce or remedy the visual error in subsequently captured digital images.

18. The method of claim 17, wherein the watermark data includes a manufacturer identification and a digital camera serial number.

19. The method of claim 17, wherein the at least one visual setting indicator is user definable.

20. A method of servicing camera error comprising:

creating a watermarked image including:

capturing an image using a digital camera;

collecting watermark data; and embedding the watermark data within the digital image to create a watermarked image, wherein the watermark data includes at least one visual error diagnostic characteristic to assist identification of at least a partial cause of visual error in the watermarked image;

viewing the watermarked image to determine when the watermarked image includes a visible error; and diagnosing the cause of the visible error including:

extracting the watermark data from the watermarked image to obtain the watermark data; and diagnosing errors in one or more image settings of the digital camera that at least partially causes the visible error by accessing the watermark data in consideration of the visible error in the watermarked image; and determining, by a diagnostic device based on user input, at least one adjustment image setting to reduce or remedy visual errors in subsequently captured digital images.

* * * * *